E. E. UNDERWOOD.
PHOTOGRAPHIC SHUTTER.
APPLICATION FILED SEPT. 23, 1915.

1,176,329.

Patented Mar. 21, 1916.

INVENTOR
Ernest E. Underwood

BY
his ATTORNEYS

UNITED STATES PATENT OFFICE.

ERNEST E. UNDERWOOD, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

1,176,329. Specification of Letters Patent. Patented Mar. 21, 1916.

Application filed September 23, 1915. Serial No. 52,162.

*To all whom it may concern:*

Be it known that I, ERNEST E. UNDERWOOD, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to photography and more particularly to photographic shutters and it has for its object to provide a simple and inexpensive means of defining and maintaining the different positions of the various sliding shutter controlling members in the cheaper makes of shutters such as are employed upon the simpler forms of box cameras used by children and other amateurs.

A further object is to simplify the assembling of such a camera or shutter.

To these and other ends the invention resides in certain improvements and combinations of parts all as will be hereinafter more fully described, the novel features being pointed out in the claims at the end of the specification.

Figure 1:
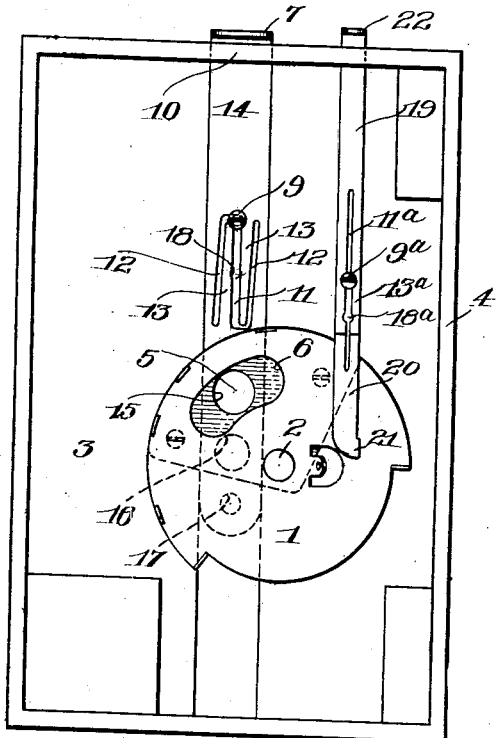
Figure 2:
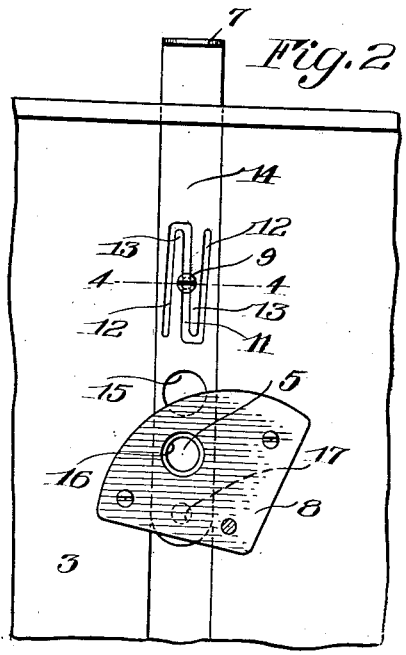
Figure 3:
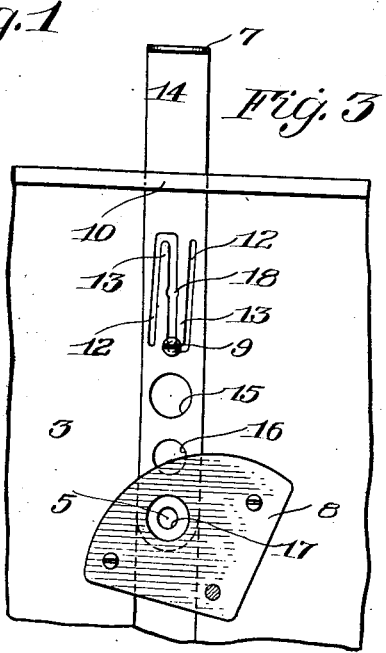
Figure 4:
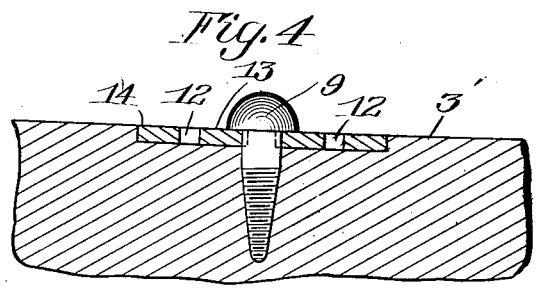

In the drawings: Figure 1 is an elevation of a camera wall showing a shutter mechanism embodying two controlling members constructed in accordance with and each illustrating one embodiment of my invention; Figs. 2 and 3 are similar fragmentary views showing one of the controlling members in two different additional positions, and Fig. 4 is an enlarged section through a controlling member taken substantially on the line 4—4 of Fig. 2.

Similar reference numerals throughout the several figures indicate the same parts.

The shutter shown is of the rotary type embodying a blade 1 pivoted at 2 on the front wall 3 of a camera 4. The lens aperture is indicated at 5 and the movement of a shutter aperture 6 in the disk or blade 1 past this lens aperture effects the exposure.

A multiple diaphragm 14 is employed to reduce or increase the illumination, that is, the maximum amount of light that may be admitted through the lens aperture as the opening 6 passes into register. This light controlling member is in the present form of a sliding plate let into and guided by the camera wall 3, as shown in Fig. 4, and having an operating portion 7 projecting to and accessible from the exterior of the camera 4. The plate is slidably retained in position beneath a fixed shutter plate 8 on which the blade 1 is mounted and beneath the head of a screw or other projection 9 and by the slot through which it enters the camera body at 10. As it slides, one of the diaphragm apertures 15, 16, 17 of graduated sizes, is selectively brought opposite the lens aperture 5. The projection 9 is straddled by a split portion of the plate and traverses a central slot 11 in the latter as the plate slides. On opposite sides of such slot are converging intersecting slots 12 which, jointly therewith, form interior arranged spring fingers 13 engaging opposite sides of the pin and having rounded ends. These fingers are normally spread by the pin and thereby placed under tension so that when the pin reaches the respective ends of the slot 11 bringing the end apertures 15 and 17 opposite the lens aperture 5, the ends of the fingers form shoulders that spring into place behind it and resist but do not prevent its return movement. Thus, the two operative positions of the plate 6 to utilize the diaphragm openings 15 and 17 are defined and the openings properly centered. The plate is held in position until substantial pressure is exerted on the operating portion 7 to deflect the fingers 13 through their rounded ends riding over the projection. To correctly determine the position of the intermediate diaphragm opening 16, the sides of the fingers adjacent to the projection are provided at intermediate points with rounded nicks 18 which contribute shoulders that similarly engage and retain the projection 9 when brought opposite to it and which yield in the same manner.

Another sliding controlling member 19 mounted in much the same manner as the member 14 is shown at the right thereof. This member serves as the adjustable stop coöperating with the shutter blade 1 to arrange for either an instantaneous or a time exposure, as desired, but the precise manner in which it accomplishes this is not necessary to an understanding of the present invention and need not be described in detail. An offset portion 20 overlaps the blade 1 and an inwardly extending stop shoulder 21 has two positions at different distances from the center of rotation of the blade as the plate 19 is thrust inward or pulled outward by means of the finger portion 22. The plate 19 is narrower than the plate 14 and is bifurcated by only a single central slot $11^a$ which provides two yielding portions $13^a$ engaging under spring tension the opposite sides of a screw or headed projection $9^a$. These yielding portions are provided with oppositely arranged nicks $18^a$ that act in the manner of the nicks 18 and hold the controlling member in either of its two positions.

It will be seen that the device, in either case, is of the simplest construction and very easily assembled while durable and sufficiently positive in its action.

I claim as my invention:

1. In a photographic shutter, the combination with a support having a fixed projection therein, of a sliding controlling member having two positions and comprising a split spring plate arranged to straddle the projection under tension and having shoulders adapted to spring into engagement with the projection and to hold the member in one of said positions.

2. In a photographic shutter, the combination with a support having a fixed projection therein, of a sliding controlling member having two positions and comprising a plate divided by slots to form two interiorly arranged spring fingers engaging upon opposite sides of the projection by which latter they are normally spread and placed under tension, one of said fingers being provided with shoulders adapted to spring into engagement with the projection and to hold the member in one of said positions.

ERNEST E. UNDERWOOD.

Witnesses:
EDITH WATERSTRAAT,
M. JOSEPH SULLIVAN.